United States Patent
Gordon

(10) Patent No.: US 10,861,289 B1
(45) Date of Patent: Dec. 8, 2020

(54) SYSTEMS AND METHODS FOR PROVIDING SPORTSBOOK WAGERING AND FANTASY GAMING APPLICATIONS

(71) Applicant: Premier Punt Group Ltd., Aberdeen (GB)

(72) Inventor: John Gordon, Aberdeen (GB)

(73) Assignee: Incentive Games LTD

( * ) Notice: Subject to any disclaimer, the term of this patent is extended or adjusted under 35 U.S.C. 154(b) by 0 days.

(21) Appl. No.: 15/938,915

(22) Filed: Mar. 28, 2018

Related U.S. Application Data

(60) Provisional application No. 62/478,008, filed on Mar. 28, 2017.

(51) Int. Cl.
| | | |
|---|---|---|
| A63F 13/30 | (2014.01) | |
| G07F 17/32 | (2006.01) | |
| G06Q 20/24 | (2012.01) | |
| A63F 13/828 | (2014.01) | |
| G06Q 50/34 | (2012.01) | |

(52) U.S. Cl.
CPC ........ *G07F 17/3288* (2013.01); *A63F 13/828* (2014.09); *G06Q 20/24* (2013.01); *G06Q 50/34* (2013.01); *G07F 17/3225* (2013.01); *G07F 17/3244* (2013.01)

(58) Field of Classification Search
CPC ............. G07F 17/3288; G07F 17/3239; G07F 17/3244; G07F 17/3276; G07F 17/326; G07F 17/3262; A63F 13/828; A63F 13/792; A63F 13/12; G06Q 50/34; G06Q 10/06375; G06Q 10/06393
See application file for complete search history.

(56) References Cited

U.S. PATENT DOCUMENTS

| | | | | |
|---|---|---|---|---|
| 8,538,563 | B1* | 9/2013 | Barber | G07F 17/3288 700/91 |
| 2002/0153656 | A1* | 10/2002 | Maksymec | G07F 17/3288 273/138.1 |
| 2004/0214643 | A1* | 10/2004 | Parrott | G07F 17/32 463/43 |
| 2006/0223605 | A1* | 10/2006 | Pullman | A63F 1/00 463/16 |
| 2008/0132314 | A1* | 6/2008 | Robb | G07C 15/005 463/17 |
| 2008/0254876 | A1* | 10/2008 | Koustas | G07F 17/3272 463/28 |
| 2009/0197684 | A1* | 8/2009 | Arezina | G07F 17/3216 463/42 |
| 2011/0098093 | A1* | 4/2011 | Amaitis | A63F 13/12 463/4 |
| 2012/0264503 | A1* | 10/2012 | Lisenbee | G07F 17/326 463/25 |
| 2013/0040738 | A1* | 2/2013 | Mikkelsen | G06Q 30/0633 463/41 |
| 2014/0274324 | A1* | 9/2014 | Grant | A63F 13/12 463/25 |

(Continued)

*Primary Examiner* — Justin L Myhr
(74) *Attorney, Agent, or Firm* — Newman Law, LLC

(57) ABSTRACT

Systems, methods and apparatus for providing, operating, hosting and conducting a gaming application which uses selections by a participant in a fantasy gaming contest to identify the sportsbook proposition wagers most likely to be of interest to the participant and display the wagers to the participant through a user interface associated with the fantasy gaming contest user interface.

3 Claims, 3 Drawing Sheets

(56) References Cited

U.S. PATENT DOCUMENTS

2016/0019757 A1* 1/2016 Knapp ............... G07F 17/3288
                                                           463/28
2017/0072321 A1* 3/2017 Thompson ....... H04N 21/23424

* cited by examiner

SYSTEMS AND METHODS FOR PROVIDING SPORTSBOOK WAGERING AND FANTASY GAMING APPLICATIONS

CROSS-REFERENCE TO RELATED APPLICATIONS

This application claims the priority benefit of U.S. Provisional Patent Application No. 62/478,008 filed Mar. 28, 2017, the disclosure of which is incorporated herein by reference.

BACKGROUND OF THE INVENTION

The invention generally relates to systems and methods of providing, hosting and conducting gaming, and in particular, the invention relates to systems and methods for providing systems and methods that, among other things, increase the appeal, utility and player interaction with both fantasy sports and sports wagering gaming systems.

DESCRIPTION OF THE RELATED ART

Fantasy sports league games enjoy wide popularity. Generally, participants or fantasy players select or draft currently active real-life athletes to form fantasy teams. A participant's success or failure in the game corresponds to the performance of the players in real-life games. Owners of such fantasy teams compile win-loss records by competing against the other teams in the league, the winner being determined by which team's players performed better the previous week.

Because a fantasy team's performance is directly attributable to the performance of the real-life athletes on a participant's roster, early success or failure can be critical to enjoyment and/or participation throughout the season. For example, if a participant chooses several players who are performing poorly and as a result, the participant loses several fantasy games in a row, it could be statistically impossible or improbable that the participant will win the overall season.

Daily fantasy sports contests have become a popular option for participants in fantasy sports. Daily fantasy sports are like any standard points-based fantasy sports league, participants pick a team of professional players and are awarded points based off the stats the players on their team have during the length of the contest. However, daily fantasy sports differs from season-long fantasy leagues at least in the duration of the contest (that is, daily fantasy sports contests are usually only one day long) and in the amount of participants (for example, in many popular daily fantasy leagues formats, participants may compete against hundreds of others). While participants of daily fantasy sports contests consider and operate under the typical fantasy sports management principles, such as opportunity cost, consistency, game theory, risk vs. reward balancing, etc., there is often a stark differences in the rate of success between casual participants and the more advanced participants.

There is concern that the issues discussed above, if not addressed, can result in a loss of interest in both traditional fantasy sports leagues and daily fantasy sports contests. This loss of interest would result in loss of advertising and participation fees. Accordingly, it would be desirable for fantasy leagues to add features that would maintain and perhaps increase participants' interest in fantasy sports leagues of any kind.

SUMMARY OF THE INVENTION

The invention is generally directed to systems, methods and apparatus for providing, operating, hosting and conducting a gaming application in which participant interaction data, which may include data received pursuant to the participant's non-wagering activity, is used to identify, offer, deliver or otherwise provide wagering opportunities of likely interest to the participant based on the participant interaction data. In some embodiments discussed herein, the interaction data relates to selections of players for a fantasy gaming contest, but the activity and corresponding interaction data, may also relate to and include information regarding any non-wagering activity, such as Internet searching, e-sports and social gaming. Accordingly, the wagering opportunities of likely interest may relate to and include sports wagering, casino gaming, such as slots, blackjack, bingo and poker-based games, or any other wagering activity, such as lottery, peer-to-peer wagering or wagering on non-traditional matters, such as the winning picture of the year or outcome of an election.

Some embodiments of the invention are directed to a gaming system, comprising: at least one processor; at least one input device; and at least one memory device that stores a plurality of instructions that, when executed by the at least one processor, cause the at least one processor to operate with the at least one display device and the plurality of input devices to: a) receive user interaction data associated with a fantasy gaming contest, the user interaction data included one or more selections for a fantasy team, wherein each of the one or more selections for a fantasy team includes a selection of a player performing as a member of a sports team in a sporting event; b) responsive to the receipt of user interaction data, compare the interaction data with sportsbook wagering options, the sportsbook wagering options including proposition wagers, wherein the proposition wagers have outcomes depending on player and sports team performance in sporting events; c) identify one or more proposition wagers involving a selected player or the sports team the player is a member of for display on the display device; d) display on the display device the identified one or more proposition wagers; and e) generate a single electronic betting slip for both the fantasy gaming contest and selected sportsbook wagering options responsive to the receipt of a selection of one of the one or more proposition wagers.

Some other embodiments of the invention are directed to a gaming system, comprising: at least one processor; at least one input device; and at least one memory device that stores a plurality of instructions that, when executed by the at least one processor, cause the at least one processor to operate with the at least one display device and the plurality of input devices to: a) establish a user account with a credit balance; b) receive user interaction data associated with a fantasy gaming contest, the user interaction data included one or more selections for a fantasy team, wherein each of the one or more selections for a fantasy team includes a selection of a player performing as a member of a sports team in a sporting event; c) responsive to the receipt of user interaction data, compare the interaction data with sportsbook wagering options, the sportsbook wagering options including proposition wagers, wherein the proposition wagers have outcomes depending on player and sports team performance in sporting events; d) identify one or more proposition wagers involving a selected player or the sports team the player is a member of for display on the display device; e) display on the display device the identified one or more proposition wagers; f) deduct an amount of credit from a user account responsive to the receipt of a selection of one of the one or more proposition wagers; and g) award an amount of credit to the user account responsive to a winning outcome from the one or more proposition wagers.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF THE INVENTION

Figure 1:
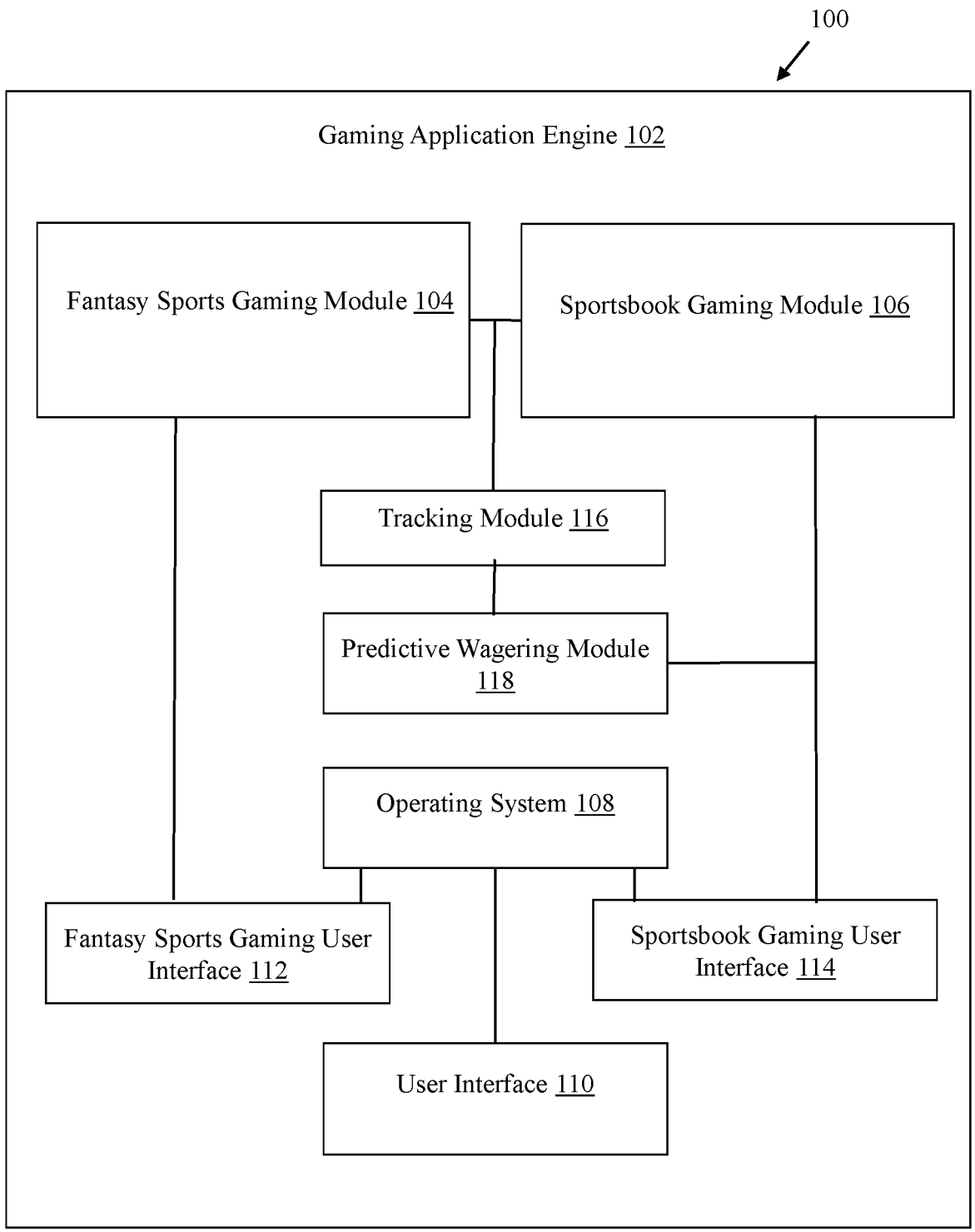
FIG. 1 is a conceptual diagram illustrating components of a gaming system constructed and configured in accordance with some embodiments of the invention.

The following detailed description provides systems and methods for implementing features in gaming applications. The gaming applications may be implemented in accordance or in conjunction with one or more of a variety of different types of software and hardware systems, such as those described herein, including devices which may be specially configured for the provision of gaming applications, such as electronic player terminals, multiplayer platforms, electronic gaming machines, and devices which are not specially configured for the provision of gaming applications, such as a smartphone, that can be enabled as a platform through which such features of the invention can be made accessible. Embodiments of the invention therefore contemplate a variety of different devices.

In particular, certain devices of those discussed herein may include and be implemented with special features and/or additional circuitry that differentiates them from general-purpose computers (e.g., desktop PC's and laptops). These devices, such as gaming terminals, are highly regulated to ensure fairness and security, and may be operable to dispense substantial monetary awards. Therefore, to satisfy security and regulatory requirements in a gaming environment, hardware and software architectures are implemented in such devices that differ significantly from those of general-purpose computers. For example, an important difference between these regulated devices and common personal computers or smartphones is that these regulated devices must demonstrate sufficient safeguards that prevent an operator or player from manipulating hardware and software in a manner that gives them an unfair and some cases an illegal advantage. As such, these devices will have a means to determine if the code it will execute is valid, and if the code is not valid, the device will have a means to prevent the code from being executed. These regulated devices may also have unique requirements that differ from a personal computer or smartphone, such as peripheral security requirements not usually addressed by personal computers or smartphones. For instance, regulated devices may include peripherals or modules and associated security features for handling money transfer, such as card or bill validators, or securely accessing and governing player or user accounts for the purpose of crediting and debiting participant account balances. While many personal computing devices may be developed to facilitate device connectivity and device compatibility they do not address the emphasis placed on security in the gaming industry.

The foregoing notwithstanding, features of the invention may be implemented on both regulated gaming devices and other devices which are not specially configured for the provision of gaming. In instances where such gaming device specific components are lacking, suitable measures are taken to address similar issues, including issues of security and game integrity, as well as issues relating to establishing secure player or user accounts and handling monetary transfers despite any lack of specific device hardware for addressing such issues. The devices may be configured to communicate with one another and/or a central server, central controller or remote host through a data network, the data network is a local area network (LAN), a wide area network (WAN), internet or an intranet. In certain such embodiments, a mobile application is used or an internet browser of the device is usable to access an internet game page from any location where an internet connection is available.

Accordingly, the term "gaming system" as used herein may refer to a group of any one or more regulated devices and/or one or more devices which are not specially configured for the provision of a gaming application of the invention, along with one or more central servers, central controllers, or remote hosts, and data networks as needed. Thus, a gaming system may more particularly include at least one processor and memory or data storage device storing program code and instructions executable by the at least one processor to control the gaming application provided via the gaming system. In some embodiments, part or all of the program code and/or the operating data is downloaded to the at least one memory of the gaming device through any suitable data network described above (such as an internet or intranet).

In various embodiments, the gaming system includes one or more input devices. The input devices may include any suitable device that enables an input signal to be produced and received by the at least one processor of the gaming system. One input device of the gaming system may be a payment device or application configured to communicate with the at least one processor of the gaming system to fund a player or user account which is capable of being accessed for the gaming application. In certain embodiments, the payment device includes one or more of a bill acceptor into which paper money is inserted, a ticket acceptor into which a ticket or a voucher is inserted, a reader or a validator for credit cards, debit cards, or credit slips into which a credit card, debit card, or credit slip is inserted to fund the gaming device, and a player identification card reader into which a player identification card is inserted to fund the gaming device. In some embodiments, the gaming system includes a payment application configured to receive funds via an electronic funds transfer, such as a transfer of funds from a bank account, or other account configured for electronically transferring funds from a bank account, or through accepting of cryptocurrency from an exchange thereof. It should be appreciated that when the gaming system is funded, the at least one processor determines the amount of funds received and displays the corresponding amount on a player or user account credit display on a user interface or any other suitable display on a display device associated with the gaming system, such as a touch-enabled display device of a smartphone.

FIG. 1 illustrates an exemplary architecture of a gaming system 100 which generally includes a gaming application engine 102 in communication with a fantasy sports gaming module 104 and a sportsbook gaming module 106. Gaming application engine 102 manages the overall operation of the gaming system 100 and therefore includes the hardware and software systems as discussed herein to provide the gaming application of the invention. Gaming application engine 102 further includes an operating system 108 that controls and enables the display of a user interface 110 on display devices, such as a participant's smartphone display or a gaming terminal. Fantasy sports gaming module 104 manages and enables fantasy sports gaming, such as daily fantasy sports leagues, through a fantasy sports gaming interface 112 relating to the play of fantasy sports gaming. Sportsbook gaming module 106 manages and enables real or virtual currency wagering on sports through a user interface 114. The wagers on sports may include any proposition wagers commonly available at a land-based or internet casino sportsbook, which are hereinafter collectively referred to as sportsbook wagering. Sportsbook gaming user interface 114 and fantasy sports gaming interface 112 may be provided simultaneously or separately on user interface 110.

Gaming application engine 102 additionally monitors and stores user interaction data via tracking module 116 which is couple with memory or enabled for exchanging information with a centralized server. Interaction data may include various audit logs and activity information for participants of the gaming application, such as any information received through user interfaces 112 and 114 regarding fantasy gaming, such as the selection of players for a daily fantasy sports contest, and sportsbook wagering, such as the types of sports wagers placed. Predictive wagering module 118 also has access to the interaction data in tracking module 116 and is in communication with sports book gaming module 106 for purposes of identifying sportsbook wagering opportunities which may be most suited or likely of interest to the user and displaying the identified opportunities through sportsbook user interface 114. The identification by predictive wagering module 118 may occur in real time or be based on historical interaction data. For example, the sportsbook wagering opportunities may include wagers on a specific player scoring first in a game responsive to the interaction data including the player selected for fantasy gaming through fantasy sports gaming interface 112, or one professional team winning against another responsive to one or more players from the team or the competing team being selected for fantasy gaming. A wager may also be identified and displayed through sportsbook wagering interface 114 if the wager is determined by predictive wagering module 118 to be the same or of a similar type as a previous wager placed through sportsbook wagering interface 114. Predictive wagering module 118 may be in further communication with a sportsbook module or engine containing information regarding available proposition wagers or for generating proposition wagers based on interaction data received and stored in tracking module 116.

It should be understood that each engine and module discussed herein may include additional modules and engines depending on the embodiment of the invention. In accordance with some of these embodiments, fantasy sports gaming module 104 contains the elements which manage the fantasy league, including a registration module, league and team management modules, including draft and transaction modules and fantasy statistics and scores modules. The registration module includes elements that register a player for a league, including the collection of personal information, as required by the operator of the game, and the necessary information for regulatory compliance. The specified registration module may also contain the rules, regulations, terms and conditions for entry in to the fantasy sports league or contest provided by fantasy sports gaming module 104. Additionally, this module may offer choices of league type, including options such a rotisseries league, head to head or others, as may be appropriate to the specific sport for which the league is being formed. In other embodiments, the gaming application engine 102 may include an non-wagering module, such as an e-sports gaming module or social gaming module, and a wagering module, such as a casino gaming module (including but not limited to, live studio gaming or simulated games, with or without one or more random number generators and instructions for random number generator driven games, such as bingo, slots, roulette, poker or blackjack), a horse-racing module or a lottery module, from which interaction data is received and analyzed by the predictive wagering module 118, with both the wagering and non-wagering modules being in communication with the gaming application engine 102 and operating system 108 for displaying both non-wagering and wagering content through user interface 110.

Module 104 may also include a league and team management module for providing such functions as league formation, player draft management, team roster management, player transactions (e.g. trades, placing or claiming players on waivers), game schedule management, score keeping and/or team ranking based upon league rules.

Other aspects of the gaming application may also be included in gaming application engine 102, such as a transaction module for managing a participant or user account and the transfer of funds and use thereof as credits for play of the fantasy gaming and sportsbook wagering through modules 104 and 106, respectively.

It should be understood that interaction data is received by any participant interaction, such as by the participant selecting players to make active, drafting players or trading players through accessing the fantasy gaming module 104 via fantasy gaming user interface 112. The receipt of interaction data by tracking module 116 may trigger predictive module 118 to identify suitable sportsbook wagering options through communication with a sportsbook for subsequent display on the sportsbook user interface 114. Other activity, such as activity relating to the fantasy sports gaming results, may trigger predictive module 118 to identify suitable sportsbook wagering options. For example, a sportsbook wagering option may be identified relating to a specific player on the participant's selected team responsive to the player or team's performance, such as the player having a particularly high fantasy score or an uncharacteristically low fantasy score.

Figure 2:
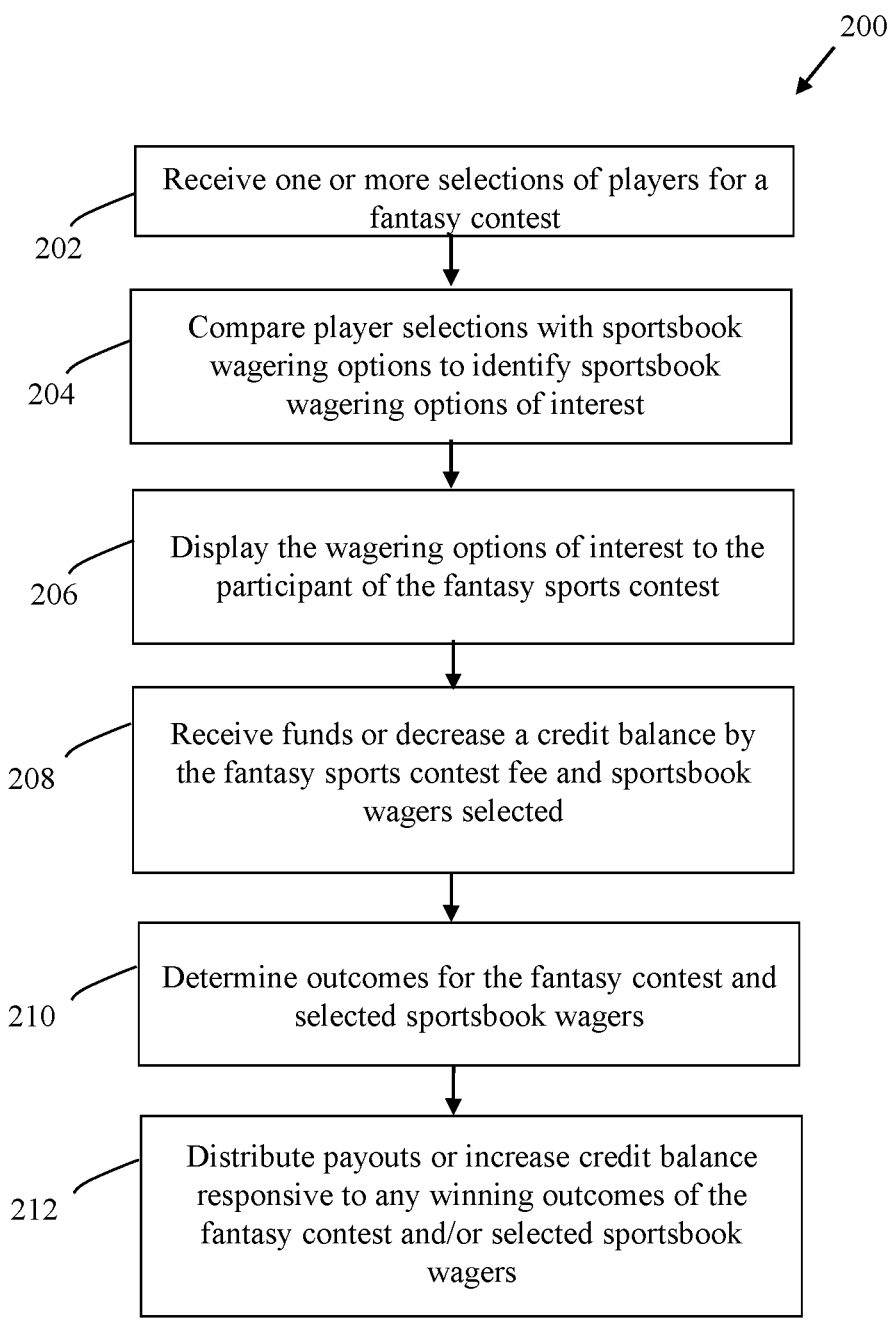
FIG. 2 is a flowchart illustrating a method of operating an exemplary embodiment of the gaming system of the invention.

FIG. 2 illustrates a flowchart of an exemplary embodiment of a process or method 200 of operating the gaming system of the invention, which may be represented by a set of instructions stored in one or more memories and executed by one or more processors which may be in communication with one or more random number generators.

As shown by block 202, participants enter into a fantasy contest by making selections of sports players for a fantasy contest through a user interface, such as fantasy gaming interface 112 provided by fantasy gaming module 104. This interaction data may be stored in memory maintained by tracking module 116. As shown by block 204, the interaction data relating to the player selections is compared with sportsbook wagering options to identify sportsbook wagering options deemed to be most suitable. In some embodiments, the most suitable sportsbook wagering options comprise any proposition wagers involving the players selected for the fantasy contest or the sports teams the selected players are members of. A processing device, such as a processing device operating in association with predictive module 118, may identify sportsbook wagering options by comparing players selected for fantasy gaming, and/or their respective teams of such players selected for fantasy gaming, with sportsbook wagering options that involve such players and/or their teams. Predictive module 118 may further filter or prioritize the sportsbook wagering options by various means, such as by accessing identification data relating to the participant's historical sportsbook wagering selections or by providing the wagering options with the highest potential payout.

As shown by block 206, the identified sportsbook wagering options are communicated to the participant, such as by displaying through a sportsbook gaming user interface 114 provided by a sportsbook gaming module 106 on a smartphone display device or gaming terminal. In some embodiments, the sportsbook wagering options are communicated to the participant immediately after the gaming system of the invention has received the participant's fantasy gaming player selections. In some embodiments, sportsbook wagering options, including in-game wagering opportunities may be communicated to the participant as the sporting events occur. In some embodiments, the participant may have the option to wager on any or all the wagering options in various monetary increments through the sportsbook gaming user interface 114, as well as conduct a search for additional wagering options through access to sportsbook gaming module 106. Any sportsbook wagering options selected may be stored as interaction data, such as by tracking module 116.

After sportsbook wagers are selected and wagering amounts are inputted, funds for the wagers and fantasy sports contest are either received through any of the methods and devices disclosed herein or credits are deducted from an established user account having funds stored therein as credits, as shown by block 208. Any credit balance for a user account is decreased accordingly. The credits or funds received may be for both the sportsbook wagering options selected and the entry fee (if any) for the fantasy sports gaming. Thus, method 200 enables a participant to generate and receive a single betting slip or electronic receipt that includes both sportsbook wagering proposition bets and a fantasy sports gaming contest entry. The outcomes from the fantasy sports gaming and the sportsbook wagering are determined by a processing device as shown by block 210, which may be a processing device operating in association with either one or both of the fantasy sports module 104 and the sportsbook gaming module 106 of gaming application engine 102. Payouts, if appropriate, are awarded either as funds or by an increase of credits to a participant's account as shown in block 212.

Figure 3:
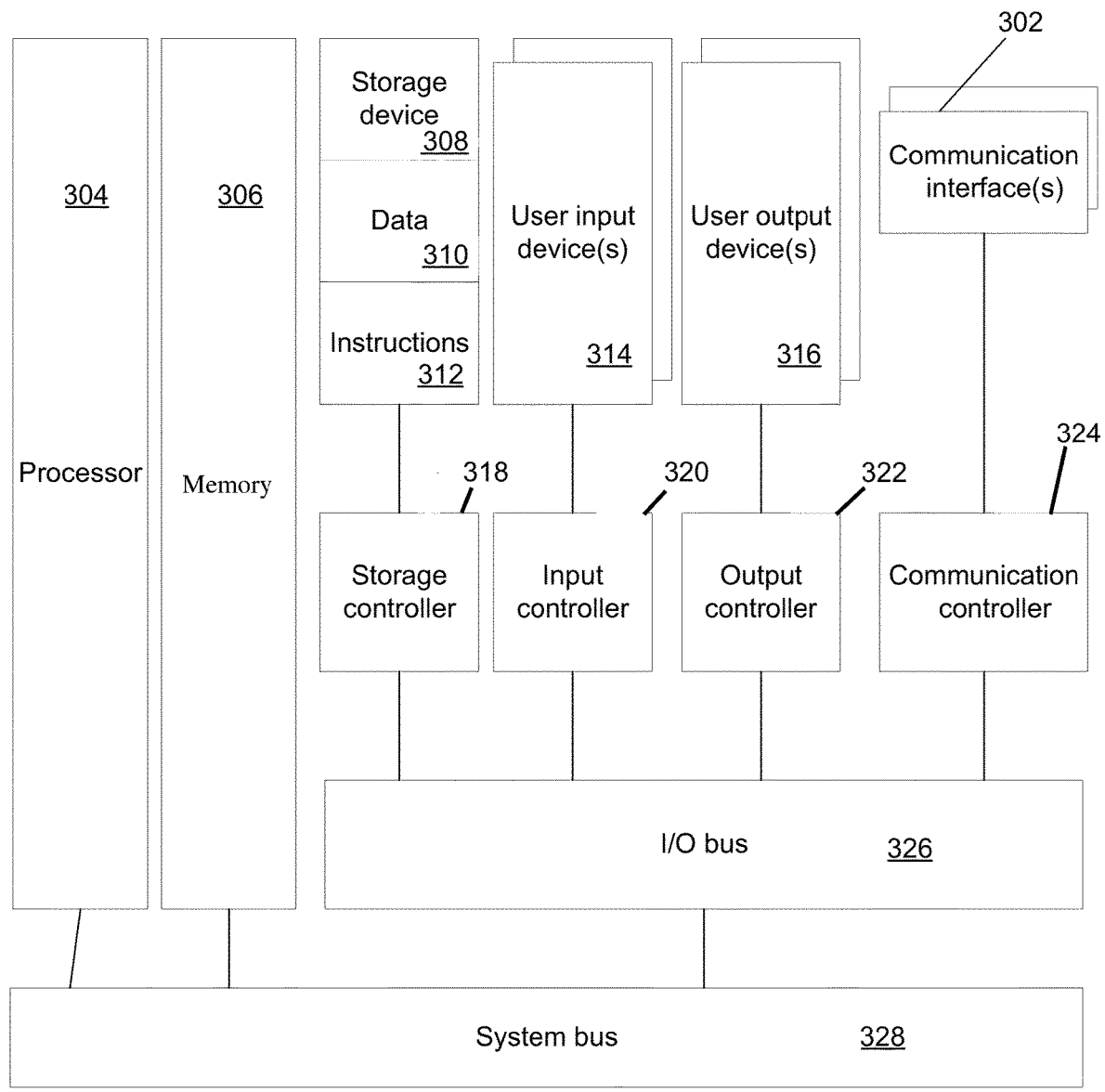
FIG. 3 illustrates a block diagram of components of a device implementing a gaming system constructed and configured in accordance with some embodiments of the invention.

Any of a variety of processing apparatuses or gaming systems can host various components of a gaming application of the invention. In accordance with embodiments of the invention, these gaming systems can include, but are not limited to, mobile devices such as a smartphone, personal digital assistant or the like, a wireless device such as a tablet computer or the like, an electronic gaming terminal, a general purpose computer, a computing device and/or a controller. A gaming system that is constructed to implement a gaming application in accordance with embodiments of the invention is illustrated in FIG. 3. In the gaming system 300, a processing device or processor 304 is coupled to a memory 306 by a bus 328. The processor 304 is also coupled to processor-readable storage media, such as a storage device 308 that stores processor-executable instructions 312 and data 310 through the system bus 328 to an I/O bus 326 through a storage controller 318. The processor 304 is also coupled to one or more interfaces that can be used to connect the processor to other processing apparatuses, such as a gaming system for providing an online sportsbook for example, as well as networks as described herein. The processor 304 is also coupled via the bus to user input devices 314, such as tactile devices including, but not limited to, keyboards, keypads, foot pads, touch screens, and/or trackballs; as well as non-contact devices such as audio input devices, motion sensors and motion capture devices that the gaming system of the invention can use to receive inputs from a user when the user interacts with the gaming system and creates interaction data. The processor 304 is connected to these user input devices 314 through the system bus 328, to the I/O bus 326 and through the input controller 320. The processor 304 is also coupled via the bus to user output devices 316 such as (but not limited to) visual output devices, audio output devices, and/or tactile output devices that the gaming system uses to generate outputs perceivable by the user when the user interacts with the gaming application. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. The processor 304 is connected to output devices from the system bus 328 to the I/O bus 326 and through the output controller 322. The processor 304 can also be connected to a communications interface 302 from the system bus 328 to the I/O bus 326 through a communications controller 324.

In accordance with various embodiments, a processor 304 can load instructions, algorithms and data from the storage device into the memory 306. The processor 304 can also execute instructions that operate on the data to implement various aspects and features of the components of a gaming application as discussed above. The processor 304 can utilize various input and output devices in accordance with the instructions and the data in order to create and operate user interfaces for players or gaming operators of a gaming application of the invention.

Although the processing apparatus 300 is described herein as being constructed from a processor and instructions stored and executed by hardware components, the gaming system can be composed of only hardware components in accordance with other embodiments. In addition, although the storage device is described as being coupled to the processor through a bus, those skilled in the art will understand that the storage device can include removable media such as, but not limited to, a USB memory device, an optical CD ROM, magnetic media such as tape and disks. Also, the storage device can be accessed by processor 304 through one of the interfaces or over a network. Furthermore, any of the user input devices or user output devices can be coupled to the processor 304 via one of the interfaces or over a network. In addition, although a single processor 304 is described, those skilled in the art will understand that the processor 304 can be a controller or other computing device or a separate computer as well as be composed of multiple processors or computing devices including one or more processors.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAIVIs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Additional information regarding exemplary embodiments of the invention is provided below.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media.

Computer storage media may include volatile and non-volatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A gaming system, comprising:
   at least one processor;
   at least one input device;
   and at least one memory device that stores a plurality of instructions that, when executed by the at least one processor, cause the at least one processor to operate with the at least one display device and in communication with the plurality of input devices to:
   a) receive user interaction data associated with a fantasy gaming contest through a user interface displayed on the display device, the user interaction data including one or more selections for a fantasy team involved in the fantasy gaming contest, wherein each of the one or more selections for the fantasy team include a selection of a player to be involved in the accumulation of fantasy points for the fantasy team, the fantasy points being attributed to the selected player for the fantasy team based on the performance of the selected player in a subsequent non-fantasy live sporting event;
   b) responsive to the receipt of user interaction data, and prior to the subsequent non-fantasy live sporting event, identify the selected player from the user interaction data, determine a non-fantasy sports team associated with the selected player in the subsequent non-fantasy live sporting event, and compare the selected player and the non-fantasy sports team with one or more sportsbook wagering options, the one or more sportsbook wagering options including one or more proposition wagers, wherein the one or more sportsbook wagering options are unrelated to the fantasy gaming contest, fantasy teams and other fantasy users, the one or more sportsbook wagering options having outcomes depending solely on the future performance of the non-fantasy sports team in the subsequent non-fantasy live sporting event;

c) responsive to the comparison, and prior to the subsequent non-fantasy live sporting event, identify the one or more sportsbook wagering options involving the non-fantasy sports team in the subsequent non-fantasy live sporting event;

d) prior to the subsequent non-fantasy live sporting event, display through the user interface displayed on the display device the identified one or more sportsbook wagering options, whereby the identified one or more sportsbook wagering options are provided are made available to a user only prior to the non-fantasy live sporting event;

e) responsive to the selection of at least one sportsbook wagering option from the one or more identified sportsbook wagering options through the user interface displayed on the display device and a selection of an amount of credit wagered prior to the non-fantasy live sporting event, generate a single electronic betting slip for both the fantasy gaming contest and the selected at least one sportsbook wagering option; and f) prior to the subsequent non-fantasy live sporting event, deduct an amount of credit from a user account responsive to the generation of the single electronic betting slip, wherein the amount of credit includes one or both of an entry fee for the fantasy gaming contest and the amount of credit wagered.

2. A gaming system, comprising:
at least one processor;
at least one input device;
and at least one memory device that stores a plurality of instructions that, when executed by the at least one processor, cause the at least one processor to operate with the at least one display device and the plurality of input devices to:

a) establish a user account with a credit balance;

b) receive user interaction data associated with a fantasy gaming contest through a user interface displayed on the display device, the user interaction data including one or more selections for a fantasy team involved in the fantasy gaming contest, wherein each of the one or more selections for the fantasy team include a selection of a player to be involved in the accumulation of fantasy points for the fantasy team, the fantasy points being attributed to the selected player for the fantasy team based on the player performance as a member of a non-fantasy sports team in a subsequent non-fantasy live sporting event;

c) responsive to the receipt of user interaction data through the user interface displayed on the display device, and prior to the subsequent non-fantasy live sporting event, identify the selected player and the non-fantasy sports team and compare the selected player and the non-fantasy sports team with one or more sportsbook wagering options, the sportsbook wagering options including one or more proposition wagers, wherein the one or more sportsbook wagering options are unrelated to the fantasy gaming contest, fantasy teams and other fantasy users, the one or more sportsbook wagering options having outcomes depending solely on the performance of the non-fantasy sports team in the subsequent non-fantasy live sporting event;

d) responsive to the comparison, and prior to the subsequent non-fantasy live sporting event, identify the one or more sportsbook wagering options involving the non-fantasy sports team in the subsequent non-fantasy live sporting event;

e) display through the user interface displayed on the display device the identified one or more wagers, whereby the identified one or more sportsbook wagering options are communicated to a user only prior to the non-fantasy live sporting event responsive to the identification of the selected player and the non-fantasy sports team;

f) responsive to a user selection of the one or more sportsbook wagering options through the user interface displayed on the display device, generate a single electronic betting slip prior to the subsequent non-fantasy live sporting event including the one or more selections for a fantasy team involved in the fantasy gaming contest and the user selection of the one or more sportsbook wagering options;

g) prior to the subsequent non-fantasy live sporting event, deduct an amount of credit from the user account responsive to one or both of an entry fee for involvement in the fantasy gaming contest and the user selection of the one or more sportsbook wagering options on the electronic betting slip; and h) subsequent to the non-fantasy live sporting event and the fantasy gaming contest, distribute an award of credit to the user account responsive to one or both of the fantasy gaming contest and the selected one or more sportsbook wagering options having a winning outcome.

3. A gaming system, comprising:
at least one processor;
at least one input device;
and at least one memory device that stores a plurality of instructions that, when executed by the at least one processor, cause the at least one processor to operate with the at least one display device and the plurality of input devices to:

a) receive user interaction data through a fantasy sports gaming interface displayed on the at least one display device, the user interaction data being associated with a fantasy gaming contest, the user interaction data including a selection of one or more players for a fantasy team involved in the fantasy gaming contest, wherein each selected player is associated with a non-fantasy sports team;

b) responsive to the receipt of user interaction data, identify one or more sportsbook wagers having outcomes that are unrelated to the fantasy gaming contest, fantasy teams and other fantasy users, the one or more sportsbook wagering options, the one or more sportsbook wagers having outcomes determined based solely on the results of a subsequent non-fantasy live sporting event including the non-fantasy sports team associated with each selected player;

c) display on the display device the identified one or more sportsbook wagers only prior to the subsequent non-fantasy live sporting event;

d) responsive to receiving a selection through the input device of at least one of the identified one or more sportsbook wagers displayed on the display device and an amount of credit prior to the subsequent non-fantasy live sporting event, deduct from a user account at least one or both of the amount of credit and an entry fee for involvement in the fantasy gaming contest;

e) prior to the subsequent non-fantasy live sporting event, generate a single electronic betting slip comprising the selected at least one of the one or more identified sportsbook wagers and the selection of one or more players for the fantasy team; and f) subsequent to the subsequent non-fantasy live sporting event, distribute an award of credit to the user account responsive to one or both of the fantasy gaming contest and any of the selected at least one of the one or more identified proposition wager having a winning outcome.

\* \* \* \* \*